United States Patent
Zhang et al.

(10) Patent No.: US 11,040,912 B2
(45) Date of Patent: Jun. 22, 2021

(54) FLY ASH-CONTAINING CONSTRUCTION MATERIAL WITH IMPROVED STRENGTH AND WATER RESISTANCE AND METHODS OF FORMING THE SAME

(71) Applicant: Arizona Board of Regents on Behalf of the University of Arizona, Tucson, AZ (US)

(72) Inventors: Jinhong Zhang, Tucson, AZ (US); Qingming Feng, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 333 days.

(21) Appl. No.: 15/770,047

(22) PCT Filed: Oct. 14, 2016

(86) PCT No.: PCT/US2016/057159
§ 371 (c)(1),
(2) Date: Apr. 20, 2018

(87) PCT Pub. No.: WO2017/070021
PCT Pub. Date: Apr. 27, 2017

(65) Prior Publication Data
US 2018/0312438 A1 Nov. 1, 2018

Related U.S. Application Data

(60) Provisional application No. 62/243,802, filed on Oct. 20, 2015.

(51) Int. Cl.
*C04B 28/02* (2006.01)
*C04B 28/00* (2006.01)
*C04B 111/27* (2006.01)
*C04B 111/10* (2006.01)

(52) U.S. Cl.
CPC .......... *C04B 28/021* (2013.01); *C04B 28/008* (2013.01); *C04B 2111/10* (2013.01); *C04B 2111/27* (2013.01); *Y02P 40/10* (2015.11); *Y02W 30/91* (2015.05)

(58) Field of Classification Search
CPC ..... C04B 28/008; C04B 18/08; C04B 28/021; C04B 40/0028; C04B 40/0263; C04B 2111/10; C04B 2111/27; Y02P 40/10; Y02P 40/165; Y02W 30/91; Y02W 30/92
See application file for complete search history.

(56) References Cited

U.S. PATENT DOCUMENTS

| | | | |
|---|---|---|---|
| 2009/0071374 | A1 | 3/2009 | Van Deventer et al. |
| 2013/0061776 | A1 | 3/2013 | Allouche et al. |
| 2013/0125792 | A1 | 5/2013 | Fried |
| 2014/0264140 | A1* | 9/2014 | Gong ...................... C04B 38/02 252/62 |
| 2015/0007751 | A1* | 1/2015 | Gupta ................... C04B 28/021 106/624 |
| 2015/0251951 | A1 | 9/2015 | Zhang et al. |

FOREIGN PATENT DOCUMENTS

| | | |
|---|---|---|
| CN | 102159516 A | 8/2011 |
| CN | 102344296 A | 2/2012 |
| CN | 106810188 A | 6/2017 |
| CN | 108349807 A | 7/2018 |
| EP | 1 801 084 A1 | 6/2007 |
| WO | WO2012170667 A1 | 12/2012 |
| WO | WO 2015/049010 A1 | 4/2015 |

OTHER PUBLICATIONS

Zhang J. et al. "Geopolymers for immobilization of Cr6+, Cd2+, and Pb2+", Journal of Hazardous Materials, Elsevier, Amsterdam, NL, vol. 157, No. 2-3, Sep. 15, 2008, pp. 587-598.
Supplementary European Search Report of European Application No. 16 85 8029.
Zhang et al., "Synthesis and characterization of fly ash modified mine tailings-based geopolymers", Construction and Building Materials 25, 2011, pp. 3773-3781.
Feng, "Applying Mine Tailing and Fly Ash as Construction Materials for a Sustainable Development", The University of Arizona, Repository, 2015, Abstract.
Yang, "Geopolymerization of Copper Mine Tailings", Thesis, Department of Mining, Geological and Geophysical Engineering, The University of Arizona, 2012, pp. 1-54.

* cited by examiner

*Primary Examiner* — Anthony J Green
(74) *Attorney, Agent, or Firm* — Blank Rome LLP

(57) ABSTRACT

The invention is directed to a fly ash containing construction material having improved strength and water resistance. The fly ash containing material includes fly ash, an alkali solution comprising sodium hydroxide, and water. The invention further provides a geopolymerization method of forming a fly ash containing material.

12 Claims, 7 Drawing Sheets

FLY ASH-CONTAINING CONSTRUCTION MATERIAL WITH IMPROVED STRENGTH AND WATER RESISTANCE AND METHODS OF FORMING THE SAME

RELATED APPLICATIONS

This application is a national phase application of PCT/US2016/057159, filed Oct. 14, 2016, which claims priority to U.S. Provisional Application No. 62/243,802, filed Oct. 20, 2015. The entire contents of those applications are incorporated herein by reference.

FIELD OF THE INVENTION

The invention is directed to fly ash (FA) containing construction materials and geopolymerization methods of forming the same.

BACKGROUND

Geopolymerization is a process of obtaining a polymeric structure from an aluminosilicate material by dissolving at least one aluminosilicate source in a strong alkali solution, such as sodium hydroxide (NaOH), at an elevated temperature. After being cured at an elevated temperature for a specific time, the product formed from the geopolymerization process exhibited increased compressive strength. As such, the resulting product can be used as a construction material, such as for bricks or road pavement. Conventional construction materials, such as concrete, require the addition of aggregate materials to improve compressive strength, but geopolymerized products do not. As such, the geopolymerization process provides a very promising approach to utilizing aluminosilicate-based materials, such as fly ash, in place of traditional construction materials.

Fly ash is a material that is produced as a byproduct during coal combustion. It is considered industrial waste and, as such, needs to be carefully impounded because of its potential detrimental impact on the environment. Efforts have been made to try to utilize fly ash as a construction material in place of traditional construction materials, such as Portland cement, for a variety of reasons. First, fly ash is a silica/alumina rich aluminosilicate source, which makes it an ideal source for use in the geopolymerization process. Secondly, the particle size of fly ash is usually very small (<50 microns), which is ideal for use in forming construction materials. Cement, on the other hand, typically must be ground to achieve such small particle size, which increases manufacturing time and costs. Thirdly, fly ash is an ideal source for geopolymerization processes because it is reactive to alkali at relatively low temperatures as compared to other geopolymerization materials, i.e., at about 60-150° C.

In the past twenty years, many studies have been carried out on the geopolymerization of fly ash to make it a suitable construction material. However, there are some disadvantages associated with the present methods of treating fly ash. First, in most of the proposed geopolymerization methods, a salient amount of sodium silicate has to be added. This makes it difficult to determine whether the achieved mechanical strength of the resulting product is due to geopolymerization between fly ash and alkali, or to the solidification of metal silicate in air at an elevated temperature, making its predictability during manufacturing difficult. Secondly, where sodium silicate is added and the resulting geopolymerization product is soaked in water, the solution pH increases sharply and the product gradually loses its compressive strength. This is detrimental in construction applications where the materials are exposed to the outside environment, such as rain or snow. Lastly, even in ideal conditions, the compressive strength of conventional geopolymerization products typically only reaches about 50 MPa or less.

As such, improved geopolymerization processes for forming construction materials with fly ash are needed. Particularly, processes which do not require any additional components and which result in products with improved strength and water resistance are desired. Fly ash-based construction materials are also desired for the environmental reasons set forth above.

SUMMARY OF THE INVENTION

The invention is directed to a construction material which includes fly ash, an alkali solution comprising sodium hydroxide, and water. The ratio of fly ash to water to sodium hydroxide ranges from 12:2.5:1 to 17:2.5:1, preferably about 14:2.5:1, based upon weight percentage.

The invention further provides a geopolymerization method of forming a construction material, which includes the steps of combining fly ash, an alkali solution comprising sodium hydroxide, and water to form a mixture, stirring the mixture, pouring the mixture into a mold, and curing the mixture. The ratio of fly ash to water to sodium hydroxide ranges from 12:2.5:1 to 17:2.5:1, preferably about 14:2.5:1, based upon weight percentage.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF INVENTION

Figure 1A:
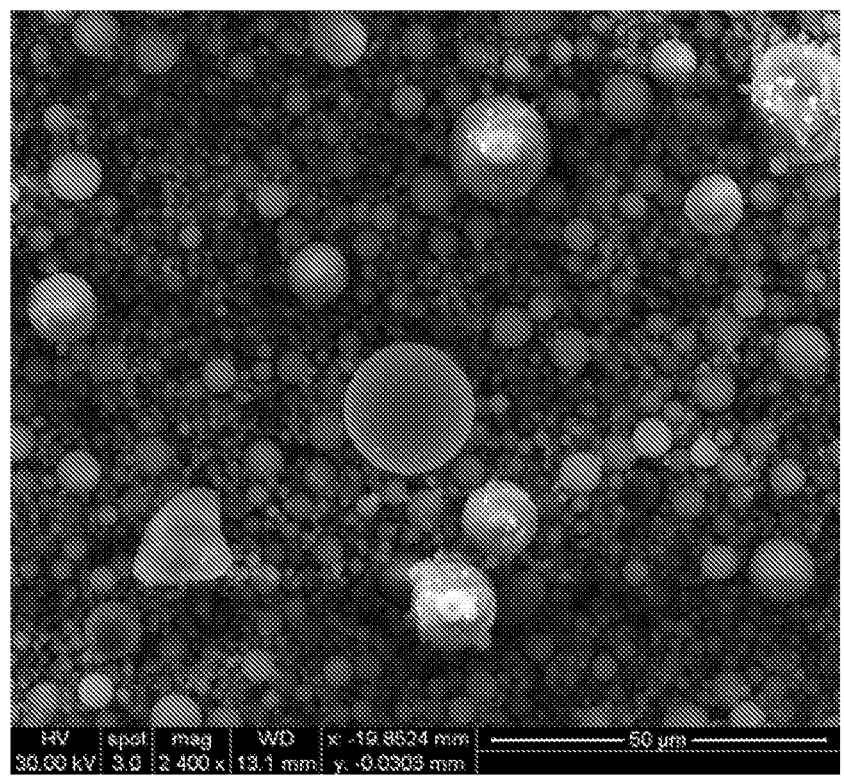
FIG. 1A is a microscopic photograph of Class C fly ash materials prepared according to an embodiment of the invention.

The present invention is directed to a fly ash containing construction material with improved compressive and flexural strength and water resistance. The fly ash materials disclosed herein do not require the use of any additional components, such as aggregates or sodium silicate, in their formation. However, in some embodiments, aggregates, such as gravel, may be included to increase the workability of the geopolymerization material. Methods of forming such a fly ash containing material are also presented which decrease manufacturing time and thus costs.

Utilizing the methods set forth herein, geopolymerization products have been prepared with a compressive strength from about 75-100 MPa, which is much higher than conventional concrete construction materials (about three times higher). Further, the curing time to form the fly ash construction material is only 2-3 days, which is much shorter than conventional concrete. Additionally, the materials may be formed at relatively low temperatures, such as 80-100° C., as compared to other conventional construction materials. The fly ash-containing material also exhibits improved flexural strength. The flexural strength of a material measures the stress just before the material yields in a flexure test and is typically about 10-20% of the material's compressive strength. The flexural strength of common concrete is generally less than 4 MPa. The flexural strength obtained by the fly ash materials of the present invention reaches as high as 9 MPa, in some instances, as high as about 10 MPa.

The geopolymerization material set forth herein generally includes three components: (1) fly ash; (2) an alkali, e.g., NaOH, $Ca(OH)_2$, or mixtures thereof; and (3) water. No additional components, such as aggregate (typical in conventional concretes) or sodium silicate (typical in current fly ash containing materials) are added. Two types of fly ash—Class F and Class C—may be utilized in the geopolymerization methods set forth herein. In one embodiment, a mixture of Class F and Class C fly ash may be used. In a preferred embodiment, a mixture of Class F and Class C fly ash, whereby the Class C fly ash is above 50% of the mixture by weight, is used. The primary difference between these classes is the amount of calcium, silica, alumina, and iron content, as well as amorphous content, in the ash. To the fly ash, a strong alkali solution is added, such as sodium hydroxide (NaOH). To this mixture, water is added to form a workable paste-like composition. In a preferred embodiment, the ratio of fly ash to water to sodium hydroxide in weight percentage preferably ranges from 12:2.5:1 to 17:2.5:1, and most preferably about 14:2.5:1. In one embodiment, the ratio of water to sodium hydroxide is fixed at 2.5:1. In yet another embodiment, the water content is relatively higher, and the ratio of fly ash to water to sodium hydroxide is in the range of 10.5:2.5:1 to 6:2.5:1. It is believed that increasing water content increases the workability of the resulting geopolymerization material.

In another embodiment, the geopolymerization material does include aggregates, such as gravel. For example, the geopolymerization material may be prepared at a gravel to fly ash to water to sodium hydroxide ratio of about 0:10.5:2.5:1 to 5.3:10.5:2.5:1. Gravel is also believed to increase the workability of the resulting geopolymerization material.

To initiate geopolymerization, each of these materials is mixed, stirred for a few minutes, such as for about 40 seconds to 2 minutes, and placed into a mold. In the last step, the mixture can either be left to set in ambient air for about 1-2 weeks, or it can be cured in an oven at temperatures of about 80-100° C. for about 1-3 days. With the former approach, construction materials having compressive strengths of about 60-70 MPa were observed. With the latter approach, materials with compressive strengths of about 80-110 MPa were achieved. Additionally, improved water resistance was exhibited by the oven-cured materials, wherein no damage was observed after completely soaking the materials in water for one month.

The invention will now be described in conjunction with the following, non-limiting examples.

Example 1

Figure 1B:
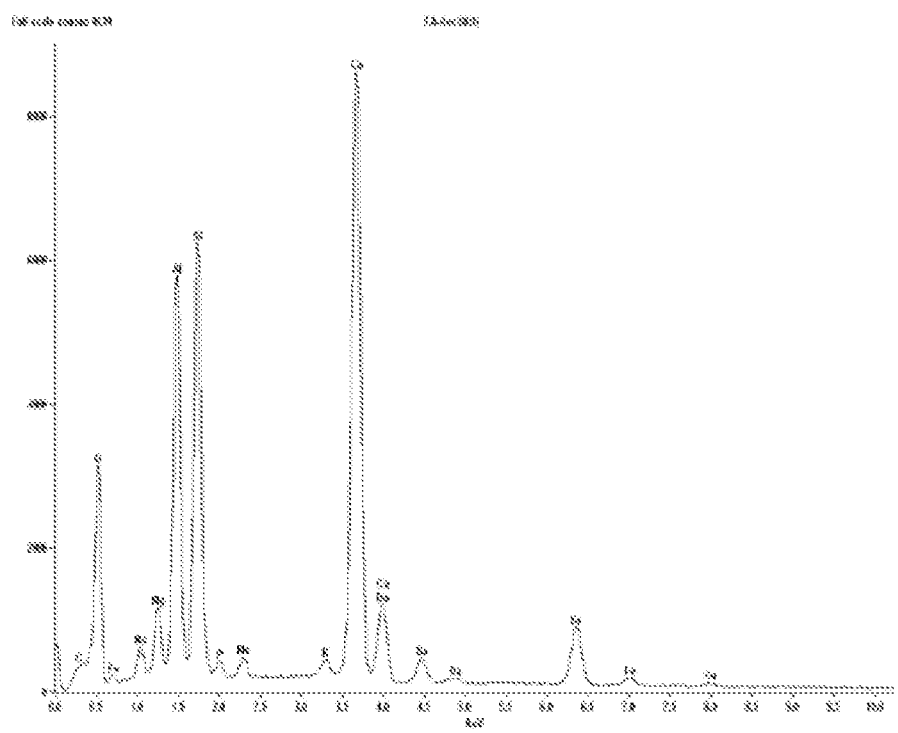
FIG. 1B is a graph illustrating the scanning electronic microscope energy-dispersive X-ray spectroscopy results of the Class C fly ash materials illustrated in FIG. 1A.

Sample fly ash (FA) containing construction materials were prepared. Research grade sodium hydroxide (NaOH, >99%) was obtained commercially from Alfa Aesar. Fly ash samples (Class C) were obtained commercially from Boral USA. Each of these materials was utilized without further processing. The Class C fly ash samples were analyzed using a FEI INSPEC-S50/Thermo-Fisher Noran 6 microscope, as illustrated in FIG. 1A. The corresponding SEM/EDS analysis is shown in FIG. 1B. It can be seen that the main elements of the fly ash were Si, Al, Ca and O, and the weight percentage of the main elements of fly ash are listed in Table 1 below. The Si/Al ratio for the fly ash samples was as low as approximately 1.2, and a low Si/Al is believed to be beneficial for the geopolymerization process.

TABLE 1

Major element composition of Class C fly ash samples

| Element | Weight % |
| --- | --- |
| Si | 14.14 |
| Al | 12.02 |
| Ca | 17.97 |
| Mg | 2.49 |
| Na | 1.98 |
| Fe | 4.04 |
| K | 0.22 |

Sodium hydroxide solutions were prepared by dissolving a specific amount of chemical pellets in tap water to prepare solutions at specific concentrations. A solution of sodium hydroxide and calcium hydroxide was slowly added into a 500 mL reaction bottle with a specific amount fly ash being filled beforehand. In this example, the ratio of fly ash to water to sodium hydroxide in weight percentage was 14:2.5:1, which forms a paste-like composition. The paste was stirred by a mechanical mixer for about 1 minute, taken out of the mixing bottle, and further filled into a cylindrical mold having an inner diameter of 3.2 cm and a height of 6.4 cm. The specimen was then de-molded and cured in an oven at 90° C. for about 1 day. Finally, the cured specimen was taken out of the oven and cooled down in ambient conditions, i.e., about 23° C., for 12 hours.

Next, the samples were prepared for compressive strength testing, which is measured by a uniaxial compression test. Before each measurement, both ends of the test specimens were polished with a piece of sand paper to make sure that they were flat enough for the compression test. The compressive strength of the fly ash samples was measured by the Versa Tester 30M testing machine at constant displacement rate of 0.0003 in/sec. The applied load on the specimen was measured and used to calculate the compressive strength. At a given experimental condition, a total of three measurements was taken and averaged. The experimental error associated with the compressive strength characterization was generally ±5 MPa.

Figure 2:
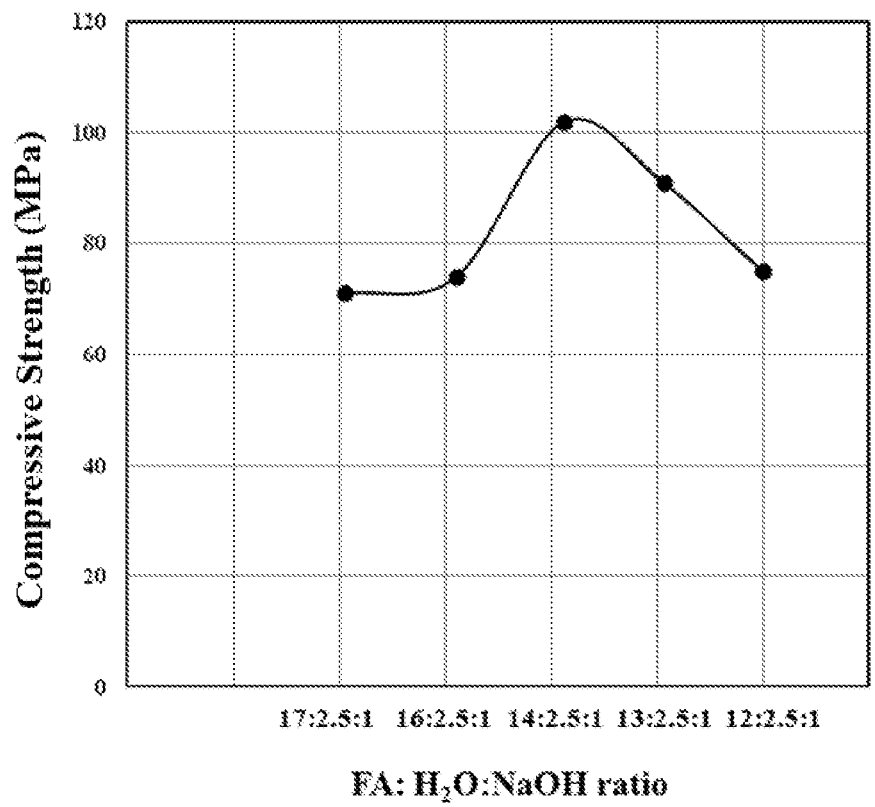
FIG. 2 is graph illustrating the effect of fly ash to water to sodium hydroxide ratio on the compressive strength of the resulting construction material according to an embodiment of the invention.

FIG. 2 shows the impact of the FA:$H_2O$:NaOH ratio (in weight percentage) on the compressive strength of the resulting geopolymerization product. As can be seen in the graph, the compressive strength increases as the ratio of FA:$H_2O$:NaOH decreases, until the ratio is above 14:2.5:1. For example, when the FA:$H_2O$:NaOH ratio is 17:2.5:1, the obtained compressive strength is about 72 MPa. When the FA:$H_2O$:NaOH ratio is 14:2.5:1, the compressive strength increases to as high as 102 MPa. When the ratio further decreases to 12:2.5:1, the compressive strength decreases to about 75 MPa. As such, the preferred ratio of FA:$H_2O$:NaOH ranges from 17:2.5:1 to 12:2.5:1 in weight percentage.

Next, the durability of the exemplary construction material in water was tested. Typically, it is desirable that a construction material not lose its compressive strength after being soaked for an extended period of time in water. The exemplary geopolymerization samples prepared above were soaked in water for a specific time to study the impact of soaking on compressive strength. Water absorption tests were also conducted at the same time. The geopolymerization product was soaked in an amount of water at 20 times the weight ratio of water to solid in a sealed container for a specific time, as set forth in FIG. 3. The samples were then taken out of the water and the surface of the samples were wiped off with a damp cloth. The samples were then weighed within five (5) minutes after being removed from the soaking bath. The specimens were then dried in an oven at about 90° C. for about 10-12 hours. The pH of the soaking water solutions was also measured after the samples were removed from the bath. For each experimental condition, three samples were prepared and tested with the compressive strength results being averaged.

Figure 3:
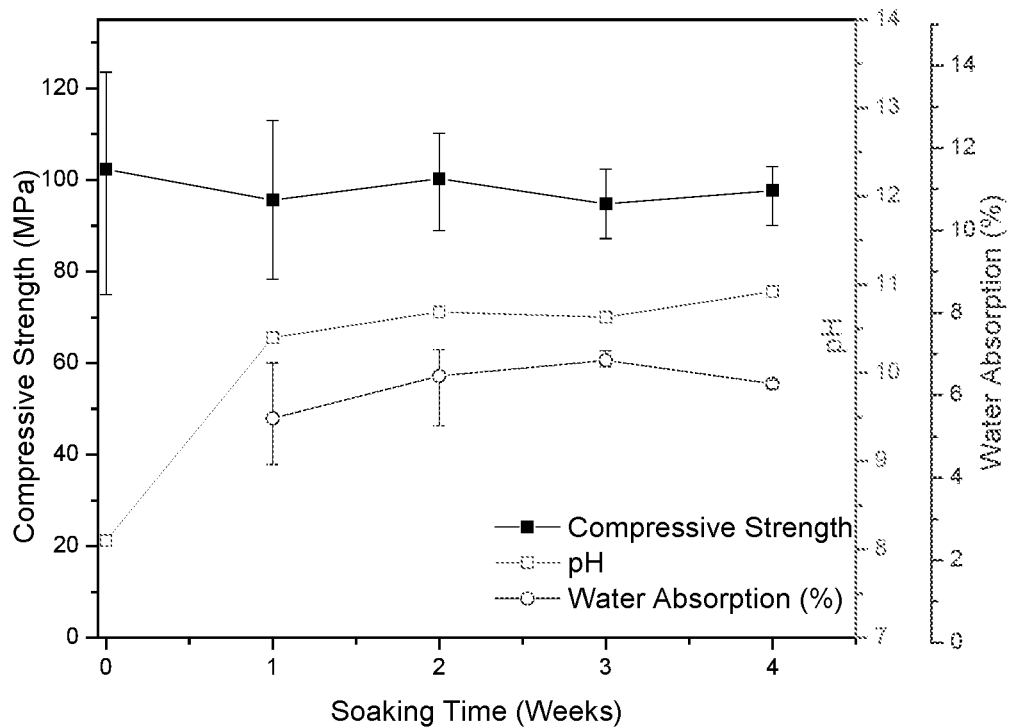
FIG. 3 is a graph illustrating the effect of water soaking time on the compressive strength, pH level and water absorption level of fly ash-containing construction materials according to an embodiment of the invention.

The compressive strength results are set forth in FIG. 3, from which one can clearly see that, when the soaking time is one week, the compressive strength of the exemplary geopolymerization product is about 95.6 MPa, which is close to the compressive strength obtained before the soaking test was performed. When the soaking time increases to two weeks, the compressive strength of samples was as high as 100.3 MPa. It is believed that this value is slightly higher than the one obtained with the one week soaking test because of the variance in the samples. As shown by the error bar in FIG. 3 (vertical lines crossing the points), it is reasonable to determine that the compressive strength is almost constant after the samples are soaked in water for two weeks. Further increasing soaking time to three weeks results in a compressive strength value of 94.8 MPa, and further increasing soaking time to four weeks results in a compressive strength of 97.7 MPa. The water-soaking test results show that the geopolymerization product prepared in this Example has a very high water resistance, as the specimens did not decrease even after soaking for up to one month.

FIG. 3 also illustrates the changes of the water bath solution pH during the soaking test. As can be seen, the pH of the soaking water increases from 8.1 to 10.7 after the specimen has been soaked for about two (2) weeks. The increase in water pH is due to the dissolution of unreacted NaOH in the geopolymer matrix in the aqueous solution. Further increasing the soaking time does not appear to further increase the solution pH. Concrete is well known as a high alkaline material, of which the pH is usually higher than 11, and sometimes higher than 12. A high alkaline material is less environmental friendly. Therefore, as shown in FIG. 3, the relatively low pH obtained with the geopolymerization product suggests that it is an environmental friendly "green" construction material.

Water absorption, indicating porosity and permeability, is another important parameter for the assessment of the quality of the exemplary construction materials. The percentage of water absorption was calculated by the following equation:

$$\text{Absorption}(\%)=[(W_2-W_1)/W_1]\times 100$$

where $W_1$ is the weight of specimen after complete drying and $W_2$ is the weight of specimen after soaking. As shown in FIG. 3, the water absorption of the exemplary specimens is 5.44% after they have been soaked in water for one (1) week. The water absorption value increases to 6.47% and then reaches a plateau after a two weeks' water soaking time. Further increasing soaking time does not appear to further increase the water absorption. After four weeks' soaking time, the water absorption is about 6.5%, which is much lower than those typically achieved in the industry. In addition, these water absorption values as are well below the water absorption allowable for different kind of bricks according to ASTM C62-12, ASTM C216-12a and C902-12a standards.

Example 2

Figure 4:
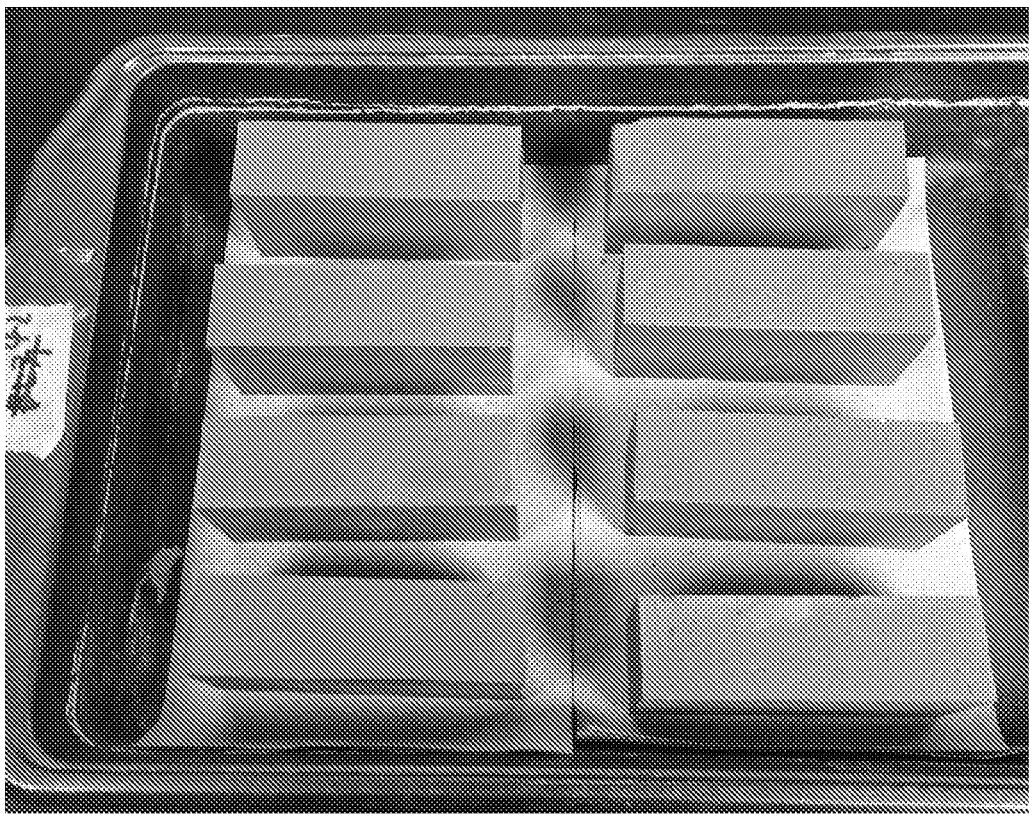
FIG. 4 is a photograph of air cured fly ash-containing construction materials according to an embodiment of the invention.
Figure 5:
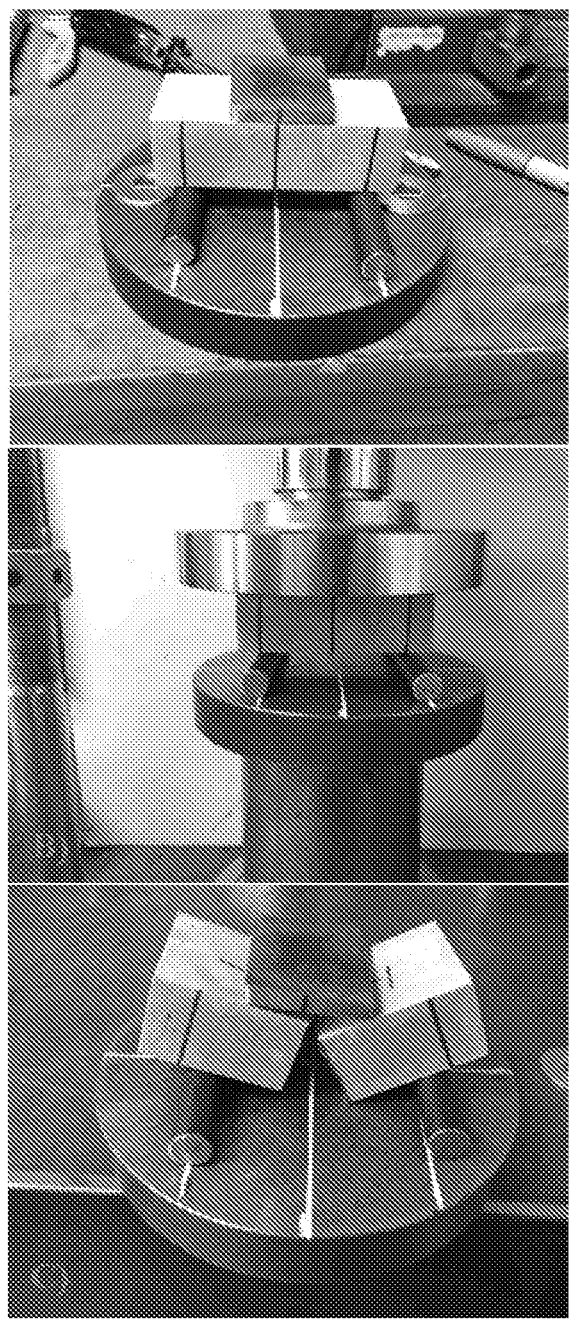
FIG. 5 are photographs illustrating the fly-ash containing construction materials of FIG. 4: (A) before flexural testing; (B) during flexural testing; and (C) after flexural testing, according to an embodiment of the invention.

Sample fly ash materials were prepared by mixing Class C fly ash with water and NaOH at a ratio of 14:2.5:1. Five samples were air cured in an ambient environment for two weeks, and five samples were oven cured at 95° C. for three days. Each of these samples was then prepared for flexural strength testing according to ASTM-C67 using a Versa Tester 30M testing machine at constant displacement rate of 0.0003 in/sec. The applied load on the specimen is measured and used for the calculation of the flexural strength. A photograph of the air cured samples is provided in FIG. 4. Photographs of the flexural test before (A), during (B), and after (C) the test is performed are provided in FIG. 5.

The results of the flexural strength testing are set forth in Table 2 below. As can be seen, the samples cured in the oven exhibited improved flexural strength over the samples cured in ambient air.

| Sample | Flexural strength (MPa) | Average |
|---|---|---|
| Air curing-1 | 4.21 | 4.84 MPa |
| Air curing-2 | 4.56 | |
| Air curing-3 | 4.60 | |
| Air curing-4 | 4.14 | |
| Air curing-5 | 6.70 | |
| Oven curing-1 | 4.21 | 7.18 MPa |
| Oven curing-2 | 9.90 | |
| Oven curing-3 | 7.46 | |
| Oven curing-4 | 5.32 | |
| Oven curing-5 | 9.01 | |

Example 3

Figure 6:
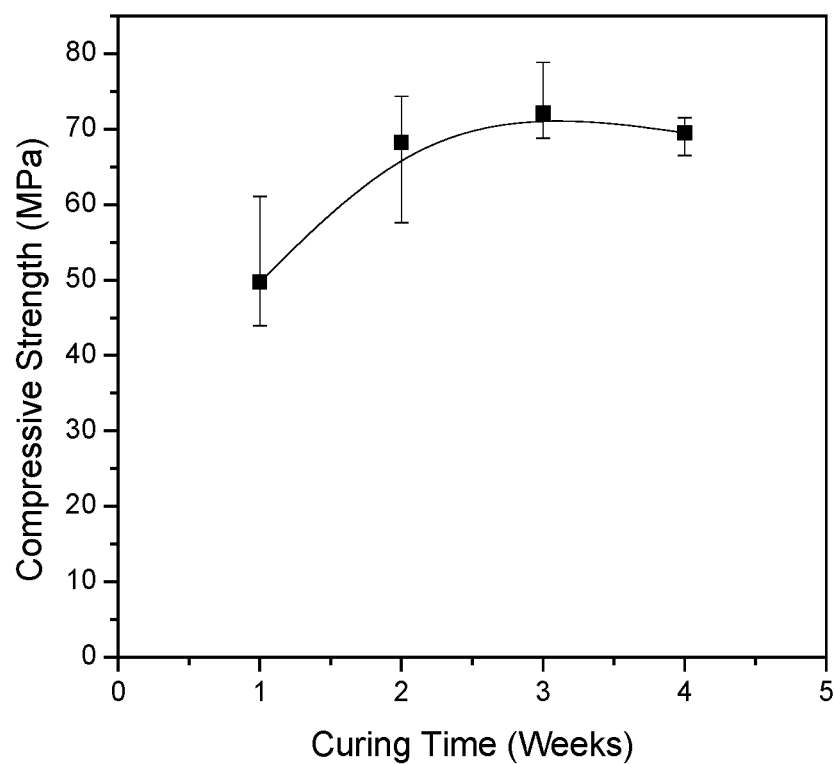
FIG. 6 is a graph illustrating the effect of ambient air curing time on the compressive strength of fly ash-containing construction materials according to an embodiment of the invention.

In Examples 1 and 2, the geopolymerization products were prepared by curing samples at about 90° C. in an oven for about one (1) day. In this Example, the curing of samples in ambient conditions and its impact on the compressive strength of such samples was studied. The specimens were prepared by mixing Class C fly ash directly with NaOH and water at a ratio of 14:2.5:1 to make a paste. The samples were then cured in air for a specific time, as set forth in FIG. 6. For each experimental condition, three samples were prepared and tested with the compressive strength results being averaged. When curing time in ambient air was one week, the compressive strength of the exemplary geopolymerization products was about 50 MPa, the value of which is higher than conventional construction materials. When the curing time was two weeks, the compressive strength increased to as high as 68 MPa. Further increasing curing time to above two weeks did not appear to further increase the compressive strength. In summary, when curing the exemplary geopolymerization products set forth herein in ambient conditions, the compressive strength reaches a plateau after about two weeks curing time and the achieved compressive strength is about 70 MPa.

Example 4

In this example, sample materials were prepared by mixing Class F fly ash with water and 10 M NaOH at a ratio of 14:2.5:1 to make a paste. The materials were prepared according to the same parameters set forth in Example 1. In this example, three samples were oven cured, one at 60° C. for one day, one at 90° C. for one day, and one at 60° C. for two days. Additionally, three other samples were cured in ambient conditions for a period of one week to four weeks. Each of the samples was then prepared for compressive strength testing according to the parameters set forth in Example 1.

Figure 7:
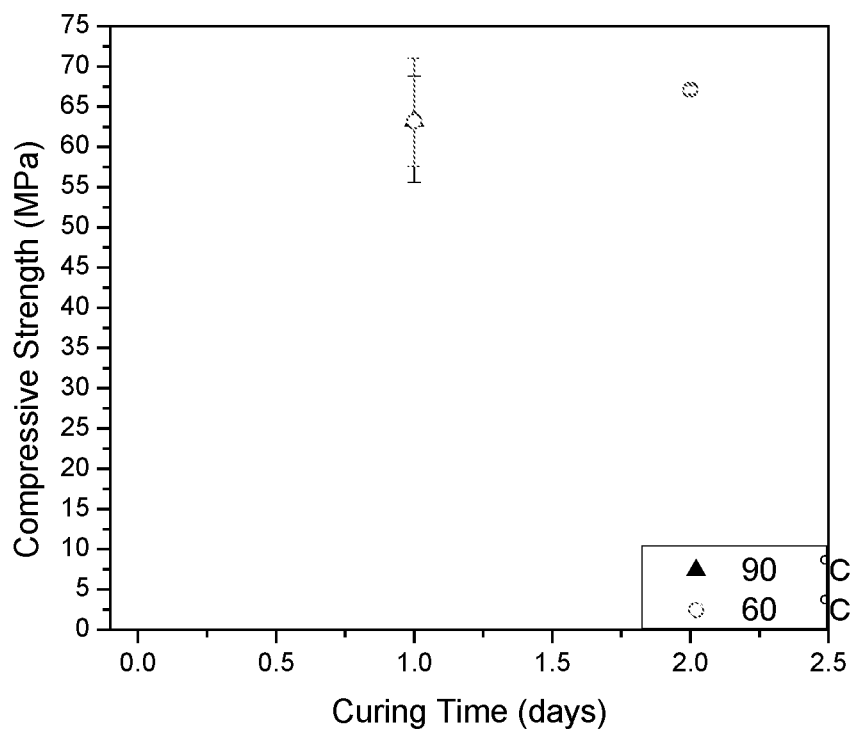
FIG. 7 is a graph illustrating the effect of oven curing temperature and time on the compressive strength of fly ash-containing construction materials according to an embodiment of the invention.

FIG. 7 shows the average compressive strength test results of each of the samples that was oven cured. As can be seen, the compressive strength is almost equal—about 63 MPa—after one day of curing at both 60° C. and 90° C. curing temperatures. When curing time increases to two (2) days, with a curing temperature of 60° C., the compressive strength increases to about 67 MPa. As such, it can be determined that the samples acquire most of their compressive strength within the first day of curing.

Figure 8:
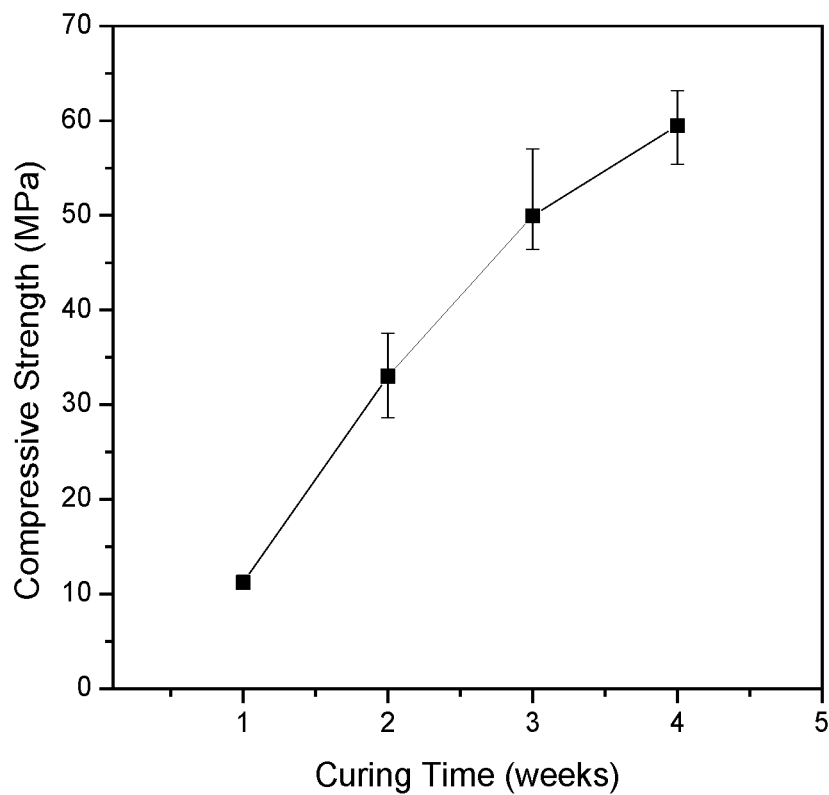
FIG. 8 is a graph illustrating the effect of ambient air curing time on the compressive strength of fly ash-containing construction materials according to an embodiment of the invention.

FIG. 8 shows the average compressive strength test results of each of the samples that was cured in ambient air. As illustrated, after air curing for about one week, the compressive strength is about 11 MPa. After air curing for about two weeks, the compressive strength increases to about 33 MPa; after air curing for about three weeks, the compressive strength increases to about 50 MPa; and lastly, after air curing for about four weeks, the compressive strength increases to about 60 MPa. As can be seen in FIG. 8, the growth rate of compressive strength gradually decreases as the curing time increases.

Example 5

Figure 9:
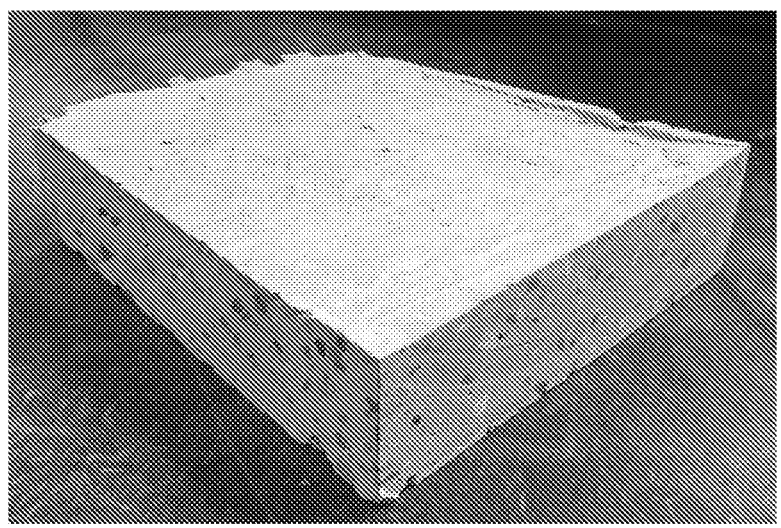
FIG. 9 is a photograph of an exemplary geopolymerization product prepared with fly ash, water, sodium hydroxide and gravel.

In this example, the strength properties of geopolymerization samples preparing with an increased amount of water content and gravel content was studied. The workability of the samples increases with increased water content and gravel content. Three samples were prepared with a fly ash (Class C fly ash) to water to sodium hydroxide ratio of 10.5:2.5:1, 8:2.5:1, and 6:2.5:1, respectively. In addition, geopolymerization samples were prepared at a ratio of gravel (<6 mm in diameter) to fly ash to water to sodium hydroxide of 1.1:10.5:2.5:1, 3.1:10.5:2.5:1 and 5.3:10.5:2.5:1, respectively. One of the samples having a pad size of 0.7 m×0.5 m×0.06 m is shown in FIG. 9.

The workability was measured using the "Abrams cone" concrete slump test, which measures the plasticity of a batch of concrete following ASTM C143 Standard. The solid cone was made by using the freshly-prepared geopolymerization pastes set forth above. During the slump tests, it was found that the workability of these geopolymerization materials is improved with increasing water content. The hardening time increases from one minute where the fly ash:water:sodium hydroxide ratio is 14:2.5:1, to ten (10) minutes where the same ratio is 6:2.5:1. It was observed that, even those the water content was increased with respect to the ratio of fly as to water to sodium hydroxide (6:2.5:1), the cone actually did not slump to a significant degree. It is believe that this is because the material starts getting hard very quickly, even within five (5) minutes. Thus, after the Abrams cone is filled with these materials and the cone is lifted, the formed cone has already begun hardening. The slump depth of the cone was typically less than 0.5 cm.

Figure 10:
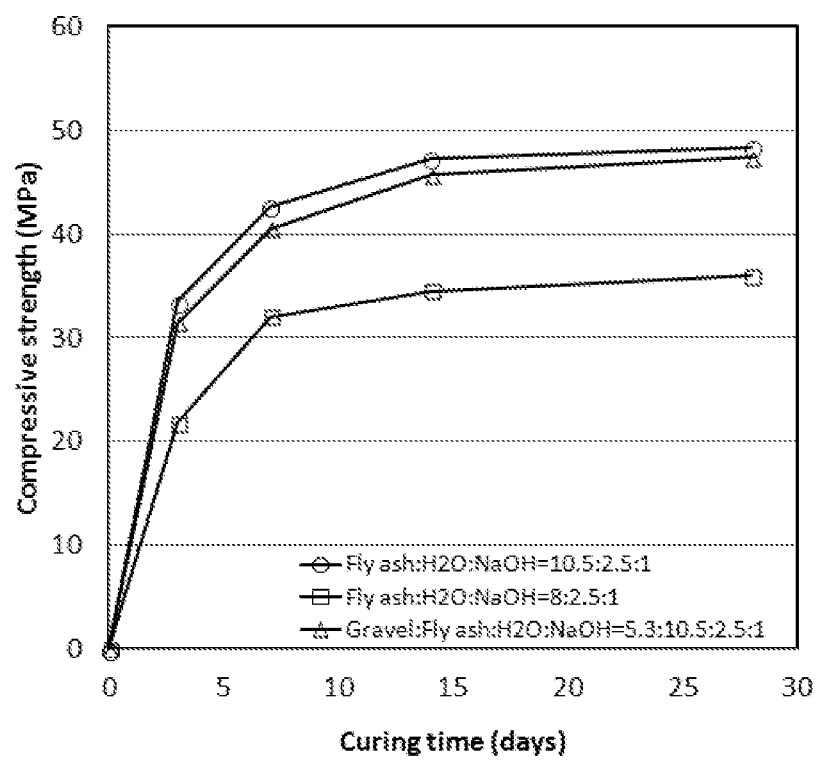
FIG. 10 is a graph illustrating the effect of increasing water content and gravel content on the compressive strength of construction materials according to an embodiment of the invention.

Samples from a pad having a size of 0.7 m×0.5 m. 0.06 m and a ratio of fly ash to water to sodium hydroxide of 10.5:2.5:1 were ambient air cured within a month period and tested at intervals of 3, 7, 14, and 28 days. Additional samples cured under the same conditions, but having a fly ash to water to sodium hydroxide ratio of 8:2.5:1 were tested, along with samples having a gravel to fly ash to water to sodium hydroxide ratio of 5.3:10.5:2.5:1. For each sample, three specimens were subjected to compressive strength testing according to the parameters set forth in Example 1, and the results were averaged. The results are set forth in FIG. 10.

As can be seen, the compressive strength of two of the samples—one having gravel and the other having the fly ash to water to sodium hydroxide ratio of 10.5:2.5:1—reaches a plateau at about 48 MPa after a three week curing time. It is believed that the increase in water content causes a relatively slight decrease in compressive strength as compared to the other geopolymerization materials disclosed herein, but the compressive strength is still comparable to other conventional construction materials. Further, including gravel increased the workability of the material but did not have a detrimental effect on the compressive strength. It is believed that gravel can be added to some geopolymerization materials in an amount as high as 50% to increase workability without affecting strength performance.

The sample having an even greater water content—fly ash to water to sodium hydroxide of 8:2.5:1—the compressive strength reaches a plateau of about 35 MPa after a three week curing time.

Although this invention has been described in connection with specific forms and embodiments thereof, it will be appreciated that various modifications other than those discussed above may be resorted to without departing from the spirit or scope. For example, equivalent elements may be substituted for those specifically shown and described, certain features may be used independently of other features, and in certain cases, particular locations of elements may be reversed or interposed, all without departing from the spirit or scope as defined in the appended Claims.

What is claimed:

1. A mixture for the fabrication of a construction material, the mixture consisting essentially of:

fly ash;

an alkali solution comprising sodium hydroxide; and water, wherein the ratio of fly ash to water to sodium hydroxide ranges from 12:2.5:1 to 17:2.5:1, based upon weight percentage.

2. The mixture of claim 1, wherein the fly ash is a mixture of Class C fly ash and Class F fly ash.

3. The mixture of claim 2, wherein the mixture is made of at least 50% by weight of Class C fly ash.

4. The mixture of claim 1, wherein the fly ash consists of Class C fly ash.

5. The mixture of claim 1, wherein the fly ash consists of Class F fly ash.

6. The mixture of claim 1, wherein the ratio of fly ash to water to sodium hydroxide is 14:2.5:1.

7. The mixture of claim 1, wherein the construction material is devoid of aggregates or sodium silicate.

8. The mixture of claim 1, wherein the construction material has a compressive strength of about 75 to about 100 MPa.

9. The mixture of claim 1, wherein the construction material has a flexural strength of at least about 4 MPa and at most about 10 MPa.

10. The mixture of claim 1, wherein the alkali solution consists of sodium hydroxide and water.

11. The mixture of claim 1, wherein the alkali solution further comprises calcium hydroxide.

12. A mixture for the fabrication of a construction material, the mixture consisting essentially of:

fly ash;

an alkali solution comprising sodium hydroxide; and water, wherein the ratio of fly ash to water to sodium hydroxide ranges from 10.5:2.5:1 to 6:2.5:1, based upon weight percentage.

* * * * *